United States Patent

Fujioka

[11] Patent Number: 4,680,517
[45] Date of Patent: Jul. 14, 1987

[54] MOTOR DRIVE CONTROL DEVICE

[75] Inventor: Kazunori Fujioka, Furukawa, Japan

[73] Assignee: Alps Electric Co., Ltd., Japan

[21] Appl. No.: 715,960

[22] Filed: Mar. 25, 1985

[30] Foreign Application Priority Data

Mar. 23, 1984 [JP] Japan .................. 59-41392[U]

[51] Int. Cl.$^4$ ............................. H02P 5/06
[52] U.S. Cl. ................... 318/332; 318/359;
318/349; 318/345 R; 363/124
[58] Field of Search ............. 318/305, 314, 317, 329,
318/330, 331, 332, 333, 326, 327, 245, 264, 272,
275, 277, 359, 358, 357, 349, 345 F, 345 G, 345
B, 345 C, 345 A, 778, 779, 420, 421, 428, 514,
515, 663, 350; 363/124, 49

[56] References Cited

U.S. PATENT DOCUMENTS

| | | | |
|---|---|---|---|
| 3,500,161 | 3/1970 | Domann | 318/332 |
| 3,517,290 | 6/1970 | Gunsser | 318/332 |
| 3,569,809 | 3/1971 | Comer | 318/350 X |
| 3,845,373 | 10/1974 | Totsu et al. | 318/434 |
| 3,935,520 | 1/1976 | Johnson, III | 318/332 |
| 4,035,704 | 7/1977 | York | 318/358 |
| 4,163,278 | 7/1979 | Onoue et al. | 363/124 X |
| 4,168,454 | 9/1979 | Gmeinder | 318/332 X |
| 4,233,557 | 11/1980 | Alberbrack | 363/49 X |
| 4,259,623 | 3/1981 | Moeder et al. | 318/345 R X |
| 4,458,186 | 7/1984 | Kuriyama et al. | 318/345 B X |

Primary Examiner—William M. Shoop, Jr.
Assistant Examiner—Shik Luen Paul Ip
Attorney, Agent, or Firm—Guy W. Shoup

[57] ABSTRACT

A motor drive control device to control the speed of a motor includes a drive control section in series with the motor. Only, when a speed setting voltage exceeds a first predetermined value the, drive control section conducts to energize the motor, and when that setting voltage exceeds a second predetermined value, the drive control section is short-circuited thereacross to energize fully the motor.

3 Claims, 9 Drawing Figures

MOTOR DRIVE CONTROL DEVICE

FIELD OF THE INVENTION

The present invention relates to a motor drive control device and, particularly, to the motor drive control device which starts stably a vehicle-loaded blower motor and the like and improves its efficiency.

BACKGROUND OF THE INVENTION

Hitherto, adjustment of the rate of airflow blown for a purpose of air-cooling/heating of the car and the like was realized by the use of control means for switching in a step-by-step fashion a voltage or current being applied to a blower motor or of another control means for controlling continuously the same through transistors and the like.

Accordingly, in the case of switching in the step-by-step fashion there were the problems that the flow rate can be adjusted merely step-by-step, e.g., switched among four or five steps and, because a switch for large current is employed, its operation load is relatively heavy resulting in severe operation characteristics. Further, in the case of varying continuously the voltage and the like for the blower motor, there were the problems that the control becomes unstable, as will be described hereinafter, when the flow rate is small, for example, when the motor is started at a slow speed and, when the flow rate is maximum, i.e., when the motor is to be operated at the maximum speed. sufficient voltage can not be applied to the motor owing to the internal voltage drop of a voltage-controlling transistor, thus, a sufficient flow rate can not be obtained in the morning of the severe cold season and the like when the voltage of a battery is apt to drop.

More clearly, the prior art will be described with reference to FIGS. 1 through 4 illustrating examples of the conventional motor drive control device.

In these drawings, 1 is a blower motor, 2 is a flow rate change switch, and TR1 is a transistor.

In FIGS. 1, the blower motor 1 is one for supplying the air at the time of air-heating/cooling of the car and the like. Voltage Vm to be applied to the blower motor 1 is the battery voltage Vb minus the voltage drop determined by a resistance of a resistor connected to a terminal which is selected by the flow rate change switch 2. Accordingly, by changing arbitrarily the setting position of the flow rate change switch 2, the voltage Vm to be applied to the blower motor 1 can be changed to vary selectively the flow rate.

FIG. 2 illustrates the variation of voltage Vm to be applied to the blower motor 1 in correspondence to the setting positions of the flow rate change switch 2. For example, at SW (switch) position "OFF" the voltage Vm is zero volt, at SW position "LO" the voltage Vm is "VO", and so on. In this way, by changing the SW position from "OFF" to "LO", "M1", "M2" and "H1", the voltage Vm applied to the blower motor 1 is varied in the step-by-step fashion thereby resulting in a variation in flow rate. To achieve the foregoing operation, the flow rate change switch 2 must be operated which has a contact area and a contact pressure sufficient for direct switching of the current supplied to the blower motor 1. As a result, the prior art has the drawback that the operation load of the flow rate change switch 2 is relatively heavy and its operation characteristic is bad.

FIG. 3 illustrates another example where a transistor TR1 is employed to control the voltage Vm to be applied to the blower motor 1.

In this system, because the voltage Vm applied to the blower motor 1 is varied by the use of the transistor TR1, there is no need of operating the flow rate change switch 2 shown in FIG. 1 of bad operability.

However, as shown in FIG. 4, when the transistor-controlled blower motor 1 is started by increasing progressively an RV stroke of a variable resistor for continuous change of the flow rate to apply a voltage gradually to the blower motor 1, there appears an intermittent characteristic of voltage as indicated by the mark $\boxed{1}$. Further, when the RV stroke is increased to the maximum, a voltage drop Vce appears on the transistor TR1, thus, the maximum voltage applied to the blower motor 1 becomes equal to (Vb−Vce) which is a source voltage Vb minus the voltage drop Vce. That is, this system also has the drawback that the efficiency is low and the blower motor 1 can not provide the maximum speed resulting in a shortage of flow rate.

SUMMARY OF THE INVENION

It is an object of the present invention to overcome the foregoing drawbacks of the prior art. To achieve the foregoing object a motor drive control device according to the present invention is designed so that in case a setting voltage from a variable resistor and the like for adjustment of the flow rate decreases lower than, for example, a predetermined voltage, a voltage of higher than a predetermined level is applied to a motor to start the same and, when the setting voltage from the variable resistor decreases to substantially the minimum, short-circuiting across a continuously-variable control transistor is effected, whereby the stability of rotation at a slow speed is assured and the efficiency at a high speed is improved. On realizing the object, the motor drive control device for controlling the speed of a motor according to the present invention comprises a drive control section connected in series with the motor, a motor speed variable setting section including a constant voltage element and a variable resistor connected in series which section is connected across the series connected motor and drive control section, a start decision section which sends out a control voltage provided from the motor speed variable setting section to the drive control section when a setting voltage from the motor speed variable setting section exceeds a first predetermined value, and a short-circuit decision section which generates a control instruction to short-circuit across the drive control section when the setting voltage from the motor speed variable setting section exceeds a second predetermined value.

DETAILED DESCRIPTION OF THE INVENTION

Figure 5:
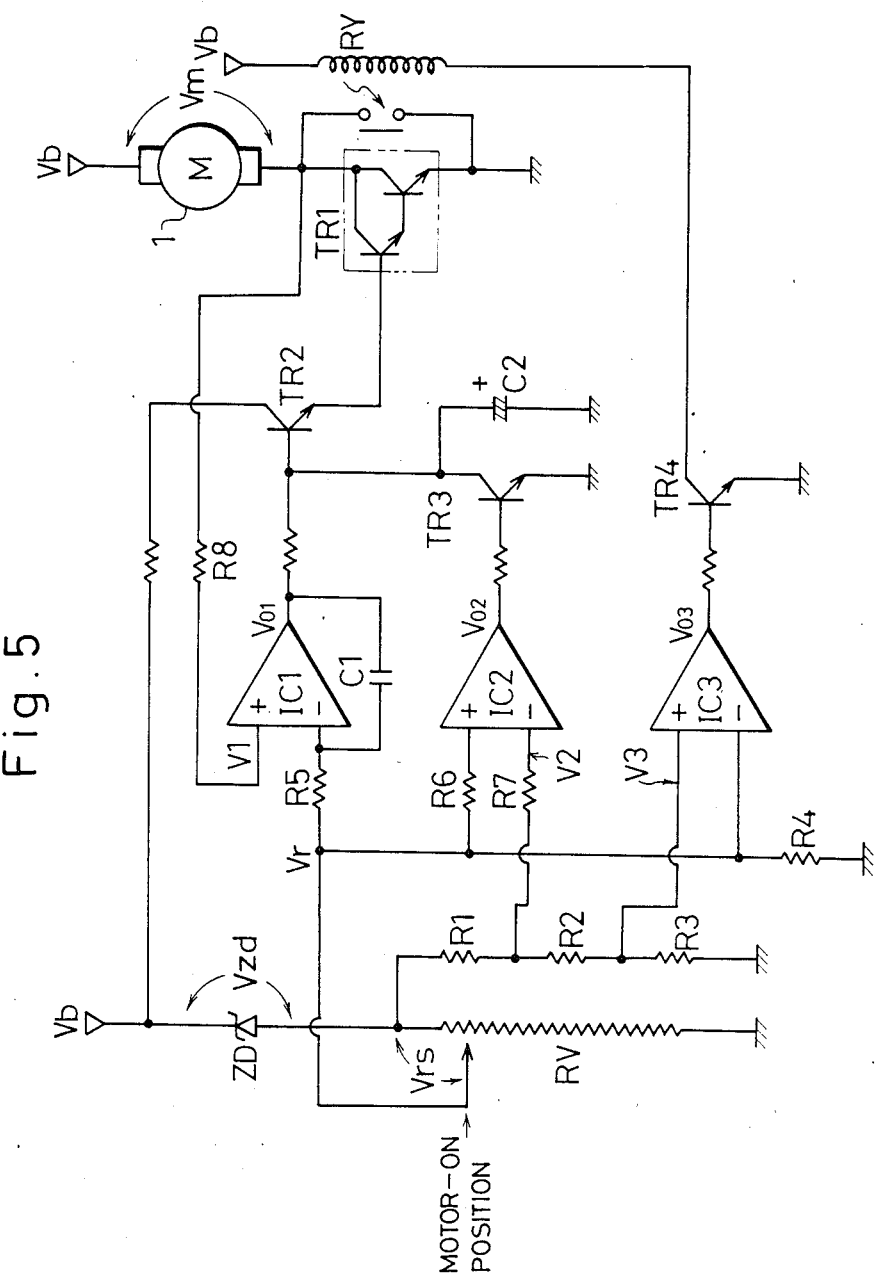
FIG. 5 is a circuit diagram of an embodiment of the motor drive control device according to the present invention.

The present invention will be described with reference to FIGS. 5 and 6 illustrating an embodiment of the present invention.

In these drawings, 1 is a blower moto, TR1 through TR4 are transistors, R1 through R7 are resistors, IC1 through IC3 are comparators, ZD is a Zener diode, and RV is a variable resistor.

In FIG. 5, the transistor TR1 is connected in the Darlington mode shown in the drawing and acts as to control the voltage Vm applied to the blower motor 1. Transistor TR2 applies a certain control voltage to the base of the transistor TR1. By moving a slider of the variable resistor RV provided in order to vary the flow rate of the blower motor 1 illustrated in the left end of the drawing, a generated setting voltage Vr is input into a negative terminal of IC1 composing a negative feedback loop, and a voltage equal to the setting voltage value Vr is generated at the lower end of the blower motor 1. Accordingly, by moving the slider of the variable resistor RV a corresponding voltage is supplied to the blower motor 1, so that the flow rate can be adjusted continuously and arbitrarily. In this place, the setting voltage Vr becomes the value "Vb−Vzd−Vrs", i.e., the source voltage Vb minus the Zener voltage Vzd generated by the Zener diode ZD minus the indicated voltage Vrs. Therefore, the voltage Vm applied to the blower motor 1 becomes as below:

Voltage $Vm$ = voltage $Vzd$ + voltage $Vrs$.

In the illustrated circuit, one end of the blower motor 1 and one end of the Zener diode ZD are connected respectively to the source voltage terminal indicated by the mark "V", and, because of the presence of the Zener voltage of the Zener diode ZD, the relation between voltage Vl and voltage Vr is preserved as below:

$Vl > Vr$ when the voltage Vrs is zero, i.e., when the blower motor 1 is not started, so that IC1 can be held in the ON state.

As the slider of the variable resistor RV is moved gradually from the upper position (where the flow rate is zero) downward (in the direction of the flow rate increasing), the transistor TR3 changes to the OFF state (the non-conducting state) when the setting voltage Vr becomes lower than the indicated predetermined voltage value V2, and the base terminal of the transistor TR2 having been grounded is released. In this way, only when the setting voltage Vr appearing on the slider of the variable resistor RV becomes lower than the predetermined voltage value V2, the voltage is applied to the blower motor 1 and the start of the blower motor 1 is surely effected. That is, the voltage "Vzd+Vrs", i.e., "Vb−V2", becomes the start voltage to start the blower motor 1.

Transistor TR4 changes to the conducting state when the slider of the variable resistor RV is moved substantially to the lowermost position in the drawing, and substantially the maximum voltage is applied to the blower motor 1, and as a result, relay RY is energized to short-circuit across the collector and emitter of the transistor TR1. As the result of this short-circuiting, no voltage drop appears on the transistor TR1 and the source voltage Vb is directly applied to the blower motor 1, thus, the source voltage Vb is equal to the voltage Vm and the flow rate is not cut short.

Figure 6A:
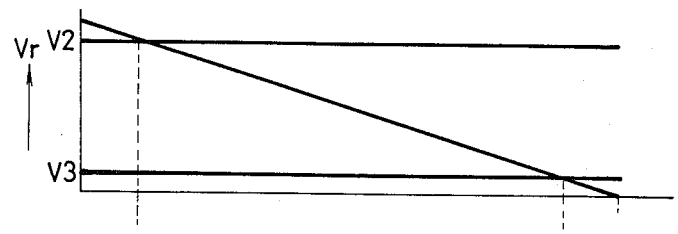
FIG. 6 is a graph for explanation of the operation of the embodiment of the present invention shown in FIG. 5.

FIG. 6(A) illustrates the varying state of the setting voltage Vr generated in response to the position of the slider of the variable resistor RV, i.e., the RV stroke. In this graph, V2 indicates the value of the setting voltage Vr at the Motor-ON position, and V3 indicates the voltage when the relay RY is actuated. In this way, because the distance through which the slider of the variable resistor RV has moved and the reference voltage Vr generated in response thereto are substantially in the proportional relationship, a desired flow rate can be obtained by setting a desired position on the slider.

Figure 6B:
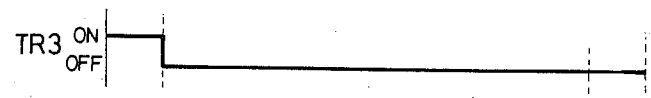

FIG. 6(B) illustrates the conducting/non-conducting state of the transistor TR3. This transistor changes to the non-conducting state when the slider of the variable resistor RV comes to the RV stroke position corresponding to the Motor-ON position and applies the voltage to the blower motor 1, thus, the intermittent voltage variation is prevented from appearing at a slow speed and a stable operation is assured.

Figure 6C:

FIG. 6(C) illustrates the conducting/non-conducting state of the transistor TR4. This transistor TR4 changes to the conducting state when the slider of the variable resistor RV comes substantially to the lowermost position in the drawing, i.e., when the voltage Vm applied to the blower motor 1 becomes substantially the maximum voltage. As the result, the collector and emitter of the transistor TR1 are short-circuited, and its voltage drop disappears.

Figure 1:
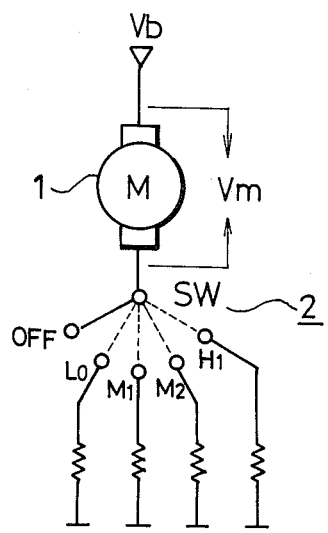
FIG. 1 is a block-diagram of an example of the conventional motor drive control device.
Figure 2:
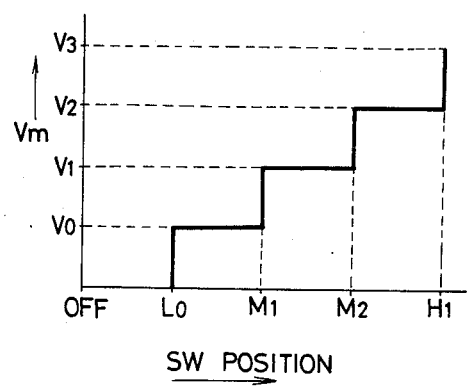
FIG. 2 is a graph for explanation of the operation of the conventional motor drive control device shown in FIG. 1.
Figure 3:
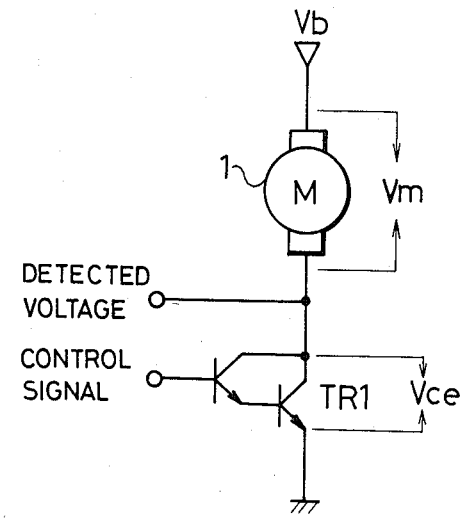
FIG. 3 is a block diagram of another example of the conventional motor drive control device.
Figure 4:
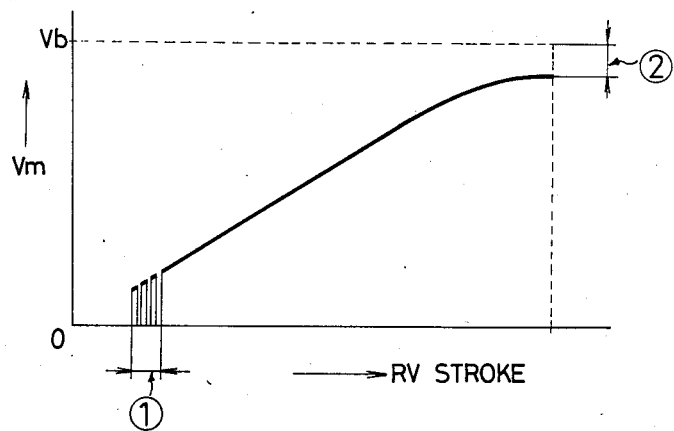
FIG. 4 is a graph for explanation of the operation of the conventional motor drive control device.
Figure 6D:
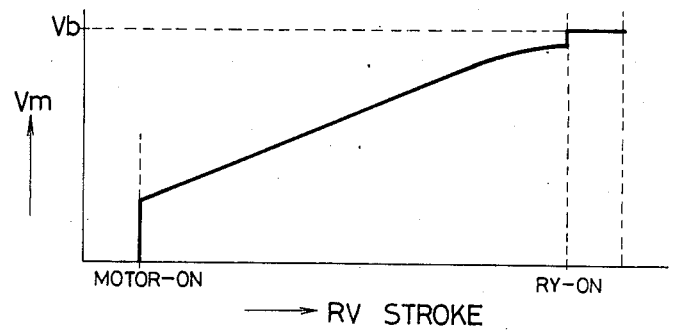

FIG. 6(D) illustrates the varying state of the voltage Vm applied to the blower motor 1. Only when the slider position (the RV stroke) of the variable resistor RV agrees with is the Motor-ON position the voltage applied to the blower motor 1, thus, the intermittent voltage variation 1 indicated in FIG. 4 can not occur. Further, because the relay RY operates when the RV stroke comes substantially to the maximum position (the RY-ON position), the voltage drop owing to the transistor TR1 disappears and the voltage Vb equal to the source voltage is applied to the blower motor 1.

As described hereinabove, according to the present invention, the voltage is applied to the blower motor to start the same from only when the setting voltage from the variable resistor and the like for flow rate adjustment becomes larger than the predetermined voltage, Also the continuously variable control transistor is short-circuited thereacross when the setting voltage from the variable resistor and the like becomes substantially the maximum. Therefore, a stable operation at a slow speed is assured, the speed can be varied continuously and increased further at the time of high speed operation, and the efficiency can be improved. In addition, because the start voltage of the blower motor and the like can be set by the Zener voltage of the Zener diode and the like, the motor can not be influenced by a variation of the source voltage. Furthermore, because the the setting voltage Vr generated by the slider of the variable resistor RV can be grounded through a resistor, even when a connection wire and the like connected to the slider of the variable resistor RV is undesirably open-circuited, this causes merely the maximum flow rate of the blower motor, not a shortage of flow rate.

While the preferred embodiment has been described, variations thereto will occur to those skilled in the art within the scope of the present inventive concepts which are delineated by the following claims.

What is claimed is:

1. A motor drive control device to control the speed of a motor comprising:
   a DC motor,
   a drive control section having a first terminal end connected with said motor and a second terminal end in series across said drive control section;
   means for applying a source voltage (Vb) of a battery across said second terminal end of said drive control section and said motor,
   a motor speed variable setting section including a variable control resistor for generating a variable setting value signal to be used by a first decision section to supply a variable control signal to said drive control section,
   a resistor having one end connected to said first terminal end of said drive control section and its other end connected to said first decision section for providing a sensed value signal indicating the voltage at said first terminal end of said drive control section,
   said first decision section having means for comparing the sensed value signal from said resistor and said setting value signal from said variable setting section and sending the variable control signal to said drive control section for variably controlling the speed of said DC motor, and
   a short-circuit decision section having means for short-circuiting said first and second terminal ends of said drive control section in response to a particular setting value signal set at said variable setting section, so as to apply the full source voltage (Vb) to said motor in order to obtain a maximum motor speed from said DC motor greater than which is obtained through operation of said drive control section.

2. A motor drive control device as set forth in claim 1, further including a relay responsive to said short-circuit decision section for short-circuiting across said drive control section.

3. A motor drive control device as set forth in claim 1, wherein said variable setting section includes a constant voltage element.

* * * * *